United States Patent [19]
Rosengren

[11] Patent Number: 6,150,305
[45] Date of Patent: Nov. 21, 2000

[54] COMPOUND AND METHOD FOR HEATING A LUBRICATED BEARING

[75] Inventor: Filip Rosengren, Göteborg, Sweden

[73] Assignee: SKF Nova AB, Goteborg, Sweden

[21] Appl. No.: 09/203,346

[22] Filed: Dec. 2, 1998

[51] Int. Cl.$^7$ .............................. F16C 33/12; F16N 39/04; F01M 5/00

[52] U.S. Cl. .......................... 508/100; 508/106; 508/107; 508/108

[58] Field of Search .................................... 508/100, 106, 508/107, 108

[56] References Cited

FOREIGN PATENT DOCUMENTS 58-038796  3/1983  Japan .

*Primary Examiner*—Jacqueline V. Howard
*Attorney, Agent, or Firm*—Burns, Doane, Swecker & Mathis, L.L.P.

[57] ABSTRACT

The present invention includes a lubricated bearing which incorporates a phase convertible compound. The compound absorbs and stores heat generated during operation of the bearing. This absorbs and stored heat is then released upon start-up conditions of the bearing, especially under low temperature conditions. The released heat is used to improve the ability of the lubricant contained within the bearings to reduce friction of the relatively movable parts contained therein.

7 Claims, No Drawings

COMPOUND AND METHOD FOR HEATING A LUBRICATED BEARING

BACKGROUND OF THE INVENTION

Starting equipment at low temperatures can often cause damage due primarily to the decreased effectiveness of lubricants to suppress friction between moving parts. One machine component that can suffer from this problem is a lubricated bearing. Damage, such as burnishing, can be caused to lubricated bearings when equipment is started at low temperatures.

One solution to this problem has been to use low temperature lubricants, i.e., lubricants which exhibit an improved ability to decrease friction at low temperatures. Bearings are commonly lubricated by lubricants having a high viscosity, such as grease or "fat". Even low temperature greases do not sufficiently suppress friction at very low temperatures. This is especially true in very cold weather regions such as the Nordic countries, Canada, Northern USA, the Arctic and Antarctic regions, etc. Therefore, it would be advantageous to provide a way of further improving the ability of lubricants, such as grease, to suppress friction at low temperatures.

OBJECTS AND SUMMARY

It is an object of the present invention to provide a lubricated bearing with a compound which is capable of releasing heat and thereby improve the ability of the lubricant contained therein to "flow" and to otherwise reduce friction at low temperatures.

It is a further object of the present invention to provide a method of improving the lubrication of a bearing at relatively low temperatures without necessitating the use of low temperature lubricants.

A lubricated bearing constructed according to the principles of the present invention includes a heat absorbing compound which is arranged to absorb and store heat while the bearing is in operation, and to release the heat when the bearing is brought into operation under cold start-up conditions. The released heat causes lubricants contained within the bearing such as grease, to experience a reduction in viscosity, thereby permitting it to flow or "bleed" lubricant within the bearing, and acting to reduce friction under low temperature conditions.

A method of lubricating a bearing practiced according to the principles of the present invention includes applying a heat absorbing composition in contact with the lubricated bearing, the heat absorbing compound absorbs frictional heat created during operation of the bearing. This absorbed heat is stored and then released when the bearing is put into operation under low temperature conditions, thereby reducing the viscosity of the lubricant contained within the bearing and improving its ability to flow and otherwise reduce friction between the moving parts thereof.

A method of using a phase convertible compound according to the principles of the present invention includes placing the phase convertible compound into contact with a lubricated bearing such that the phase convertible compound absorbs frictional heat generated during operation of the bearing, stores the heat until needed, and releases the heat upon start-up conditions of the bearing under low temperatures, thereby reducing the viscosity of the lubricant contained within the bearing and improving its ability to flow and otherwise reduce friction under these conditions.

DETAILED DESCRIPTION OF PREFERRED EMBODIMENTS OF THE INVENTION

According to the present invention, a heat absorbing compound is placed in contact with the lubricated bearing. The heat absorbing compound absorbs frictional heat generated during operation of the bearing. The absorbed heat is stored, then released when the bearing is put into operation, particularly under cold start-up conditions. The released heat causes the lubricant contained within the bearing, such as grease or "fat", to "bleed" or to undergo a reduction in viscosity which allows a lubricant to flow more easily in between the relatively movable parts of the bearing. In this manner, lubrication of the bearing under low-temperature start-up conditions is greatly improved.

The heat absorbing compound can be placed within a package. The package can then be placed within the housing of the bearing or adjacent thereto. Alternatively, the heat absorbing compound can be applied as a surface coating to a surface of the bearing housing. One such surface to which the coating may be applied is the inner wall(s) of the bearing housing.

While any suitable heat absorbing compounds may be used, certain compounds have showed themselves to be effective for this application. In one embodiment, a salt solution is used as the heat absorbing compound. The salt solution undergoes a phase transition when absorbing heat. The solution undergoes a transformation from a solid state to a liquid state when absorbing heat. The liquid phase remains stable until a reversed phase transition is initiated. This reversed transition can be initiated by any suitable mechanism. For example, mechanical vibration may be used to reverse the above-mentioned phase transition. Upon initiation of the reversed phase transition, heat will be released as the salt solution goes from its liquid to solid state. This released heat will warm the lubricant contained within the bearing.

Most salts, in particular, crystalline salts, will form phase transition systems which release heat. These salts possess a certain temperature range over which the phase transition is exhibited.

By way of example, one suitable salt solution which may be utilized consistent with the principles of the present invention is a sodium chloride crystalline salt disposed in the acetic acid. When such a solution transitions from a liquid to solid state, a considerable amount of heat is generated by this phase transformation.

A salt solution encompassed by the principles of the present invention may include a single salt or mixture of inorganic salts. Moreover, the heat absorbing solution can comprise an organic acid or compound which has a similar ability to absorb heat during phase transformations.

While such compounds have been used in other technical areas for different purposes, such as heating pads and hand warmers, their incorporation into lubricated machine components such as bearings has not been undertaken until now.

What is claimed is:

1. A method of using a phase convertible compound, said compound having a composition capable of absorbing and storing heat generated during operation of a bearing, then releasing heat when a phase transformation of the compound is initiated under low-temperature conditions, said method comprising:

placing said compound into contact with a lubricated bearing;

absorbing frictional heat generated during operation of the bearing;

initiating a phase transformation of the compound; and releasing heat generated by the phase transformation of said compound to heat said lubricant and improve the ability of said lubricant to reduce friction under low-temperature conditions.

2. A method of lubricating a bearing, said method comprising:

placing a heat absorbing compound in contact with a lubricated bearing, said compound having a composition such that it absorbs and stores heat during operation of the bearing, and releases heat generated by a phase transition of said compound;

initiating a phase transition of said compound; and heating the lubricant with heat released by said phase transition such that the ability of the lubricant to reduce friction under low-temperature conditions is improved.

3. The method of claim 2, wherein said compound is a salt which, in solution, transforms from a solid to a stable liquid phase when absorbing heat, and reverts to the solid state when releasing heat.

4. The method of claim 2, wherein said compound is an organic compound.

5. The method of claim 2, wherein said method further comprises:

placing said compound within a package; and placing said package into close contact with said bearing.

6. The method of claim 2, further comprising:

coating a surface of said bearing with said compound.

7. A lubricated bearing comprising:

a heat absorbing compound, said compound arranged to absorb heat generated during operation of the bearing and to release heat upon initiation of a phase transformation thereof, said released heat sufficient to heat the lubricant and improve the ability of the lubricant to reduce friction under low-temperature conditions.

* * * * *